US012802658B2

(12) United States Patent
Katsuta

(10) Patent No.: US 12,802,658 B2
(45) Date of Patent: Nov. 17, 2026

(54) PROTECTION CIRCUIT AND DISPLAY DEVICE INCLUDING THE PROTECTION CIRCUIT

(71) Applicant: Japan Display Inc., Tokyo (JP)

(72) Inventor: Tadayoshi Katsuta, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/186,697

(22) Filed: Apr. 23, 2025

(65) Prior Publication Data

US 2026/0004752 A1 Jan. 1, 2026

(30) Foreign Application Priority Data

Jun. 27, 2024 (JP) ................................. 2024-103814

(51) Int. Cl.
*G09G 3/36* (2006.01)

(52) U.S. Cl.
CPC ... *G09G 3/3648* (2013.01); *G09G 2300/0426* (2013.01); *G09G 2300/0819* (2013.01); *G09G 2330/025* (2013.01); *G09G 2330/06* (2013.01)

(58) Field of Classification Search
None
See application file for complete search history.

(56) References Cited

U.S. PATENT DOCUMENTS 11,641,104 B1 * 5/2023 Syu .......................... H02H 9/02 361/56
2006/0017672 A1 * 1/2006 Aoki ...................... G09G 3/325 345/77
2008/0174577 A1 * 7/2008 Fujita ................... G09G 3/3677 345/204
2017/0324237 A1 * 11/2017 Baumeler .............. H02H 3/207
2017/0357353 A1 * 12/2017 Katsuta ............... G06F 3/04164
2018/0067357 A1 * 3/2018 Katsuta ................ H10K 59/122
2020/0373374 A1 * 11/2020 Park ..................... G09G 3/3225
2023/0206833 A1 * 6/2023 In ............................. G09G 3/20 345/214
2025/0343408 A1 * 11/2025 Quax ..................... H02H 9/046

FOREIGN PATENT DOCUMENTS

JP 2010-049149 A 3/2010
JP 2020-154250 A 9/2020

* cited by examiner

*Primary Examiner* — Andre L Matthews
(74) *Attorney, Agent, or Firm* — XSENSUS LLP

(57) ABSTRACT

A display device includes a plurality of pixels, a driver circuit, first and second power-source lines, a plurality of protection circuits, and a plurality of control-signal wirings. The driver circuit is configured to control the pixels. The first and second power-source lines are respectively configured to provide the pixels with a first potential and a second potential lower than the first potential. The control-signal wirings electrically connect the protection circuits to the driver circuit. Each of the plurality of protection circuits has first and second resistor elements. The first resistor element is configured so that a first end is supplied with a control signal and a second end is electrically connected to one of the control-signal wirings. The second resistor element is configured so that a first end is supplied with the control signal and a second end is electrically connected to the one of the control-signal wirings.

16 Claims, 15 Drawing Sheets

PROTECTION CIRCUIT AND DISPLAY DEVICE INCLUDING THE PROTECTION CIRCUIT

CROSS-REFERENCE TO RELATED APPLICATION

This application claims the benefit of priority to Japanese Patent Application No. 2024-103814, filed on Jun. 27, 2024, the entire contents of which are incorporated herein by reference.

FIELD

An embodiment of the present invention relates to a protection circuit and a display device including the protection circuit.

BACKGROUND

In display devices such as liquid crystal display devices, a plurality of pixels for reproducing images as well as driver circuits for driving the pixels are provided over a substrate. The plurality of pixels and the driver circuits are composed of a large number of semiconductor elements exemplified by thin-film transistors and the like, and these elements are formed using photolithography which requires a great number of processes. Therefore, protection circuits may be provided to prevent pixels and driver circuits from being destroyed not only by surge currents but also by electrostatic breakdown caused by static electricity generated during manufacturing. For example, Japanese Laid-open Patent Applications No. 2010-49149 and 2020-154250 disclose display devices in which protection circuits are provided to protect the driver circuits.

SUMMARY

An embodiment of the present invention is a display device. The display device includes a plurality of pixels, a driver circuit, a first power-source line and a second power-source line, a plurality of protection circuits, and a plurality of control-signal wirings. The driver circuit is configured to control the plurality of pixels. The first power-source line is configured to provide the plurality of pixels with a first potential, and the second power-source line is configured to provide the plurality of pixels with a second potential lower than the first potential. The plurality of control-signal wirings electrically connects the plurality of protection circuits to the driver circuit. Each of the plurality of protection circuits has a first resistor element and a second resistor element. The first resistor element is configured so that a first end of the first resistor element is supplied with a control signal and a second end of the first resistor element is electrically connected to one of the plurality of control-signal wirings. The second resistor element is configured so that a first end of the second resistor element is supplied with the control signal and a second end of the second resistor element is electrically connected to the one of the plurality of control-signal wirings.

An embodiment of the present invention is a protection circuit. The protection circuit includes a first resistor element and a second resistor element. A first end of the first resistor element and a first end of the second resistor element are electrically connected to each other and are configured to be supplied with a control signal. A second end of the second resistor element and a second end of the first resistor element are electrically connected to each other. The control signal is selected from a clock signal, an image signal, a reset signal, and an initialization signal.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, the drawings are only an example, and do not limit the interpretation of the invention. In the specification and the drawings, the same reference number is provided to an element that is the same as that which appears in preceding drawings, and a detailed explanation may be omitted as appropriate. The reference number is used when plural structures which are the same as or similar to each other are collectively represented, while a hyphen and a natural number are further used when these structures are independently represented.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the present invention, when one film is processed to form a plurality of films, these films may have different functions and roles. However, these films originate from the film prepared as the same layer by the same process and have substantially the same layer structure, material, and morphology. Hence, the plurality of films is defined as existing in the same layer.

1. Overall Structure of Display Device

Figure 1:
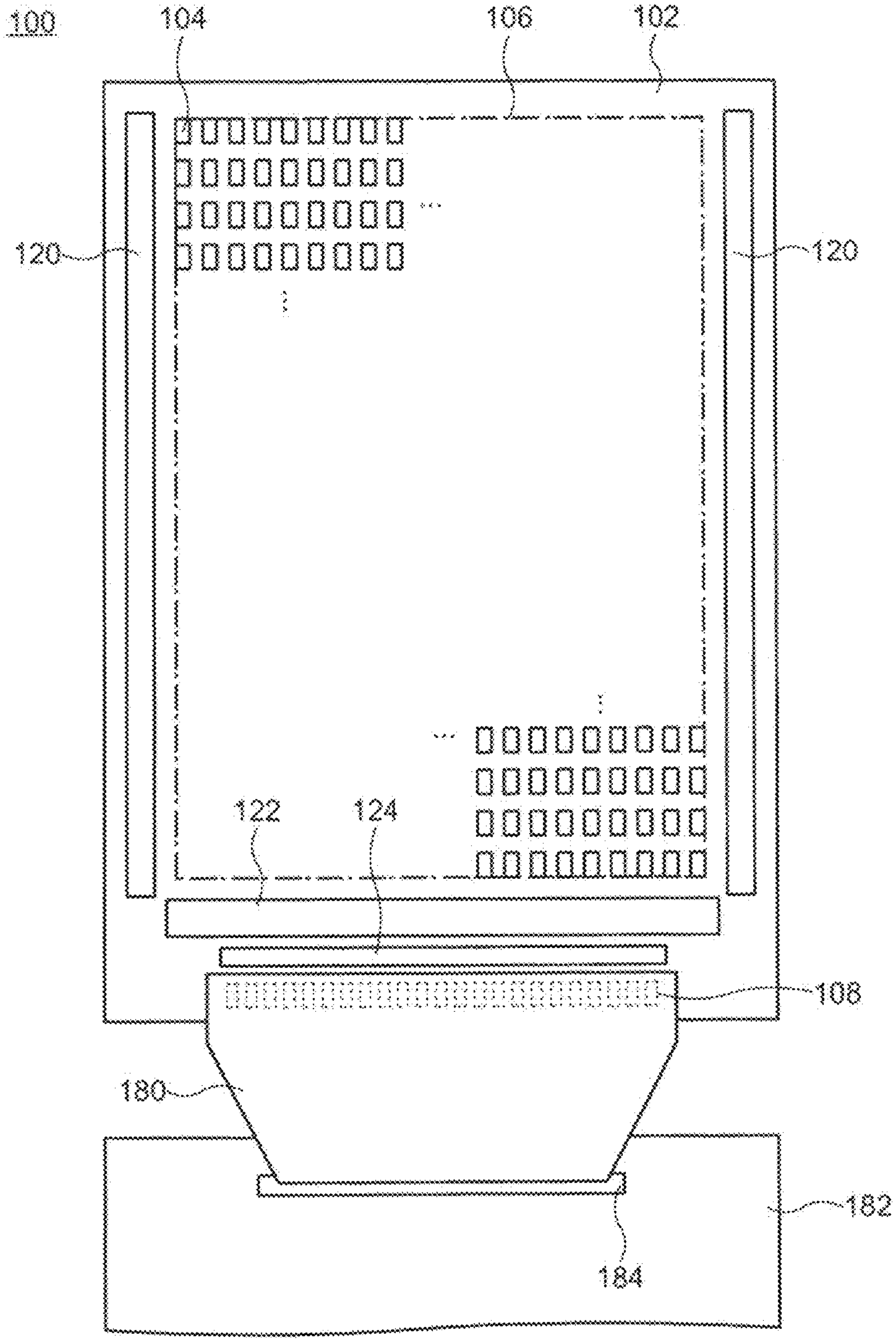
FIG. 1 is a schematic top view of a display device according to an embodiment of the present invention.

FIG. 1 shows a schematic top view of a display device 100 according to an embodiment of the present invention. The display device 100 has a substrate 102 and a counter substrate (not illustrated) facing the substrate 102. Various conductive films, semiconductor films, insulating films, and the like formed using photolithography processes are arranged between the substrate 102 and the counter substrate. Appropriate combination of these conductive films, semiconductor films, insulating films, and the like results in the formation of a plurality of pixels 104 each including a display element as well as driver circuits for driving the pixels (gate-line driver circuit 120, signal-line driver circuit 122), a protection-circuit unit 124 composed of a plurality of protection circuits to be described later, a plurality of terminals 108, and the like. The region where the plurality of pixels 104 are formed (the region surrounded by the chain line in FIG. 1) is a display region 106, while the region surrounding the display region 106 and provided with the driver circuits, the protection-circuit units 124, the terminals 108, and the like is a frame region. Although not illustrated in FIG. 1, a plurality of gate lines extending from the gate-line driver circuit 120 to the pixels 104, a plurality of image-signal lines extending from the signal-line driver circuit 122 to the pixels 104, control-signal lines connecting the protection-circuit unit 124 and the signal-line driver circuit 122, and power-source lines to supply a constant potential are formed with patterned conductive films over the substrate 102.

Figure 2:
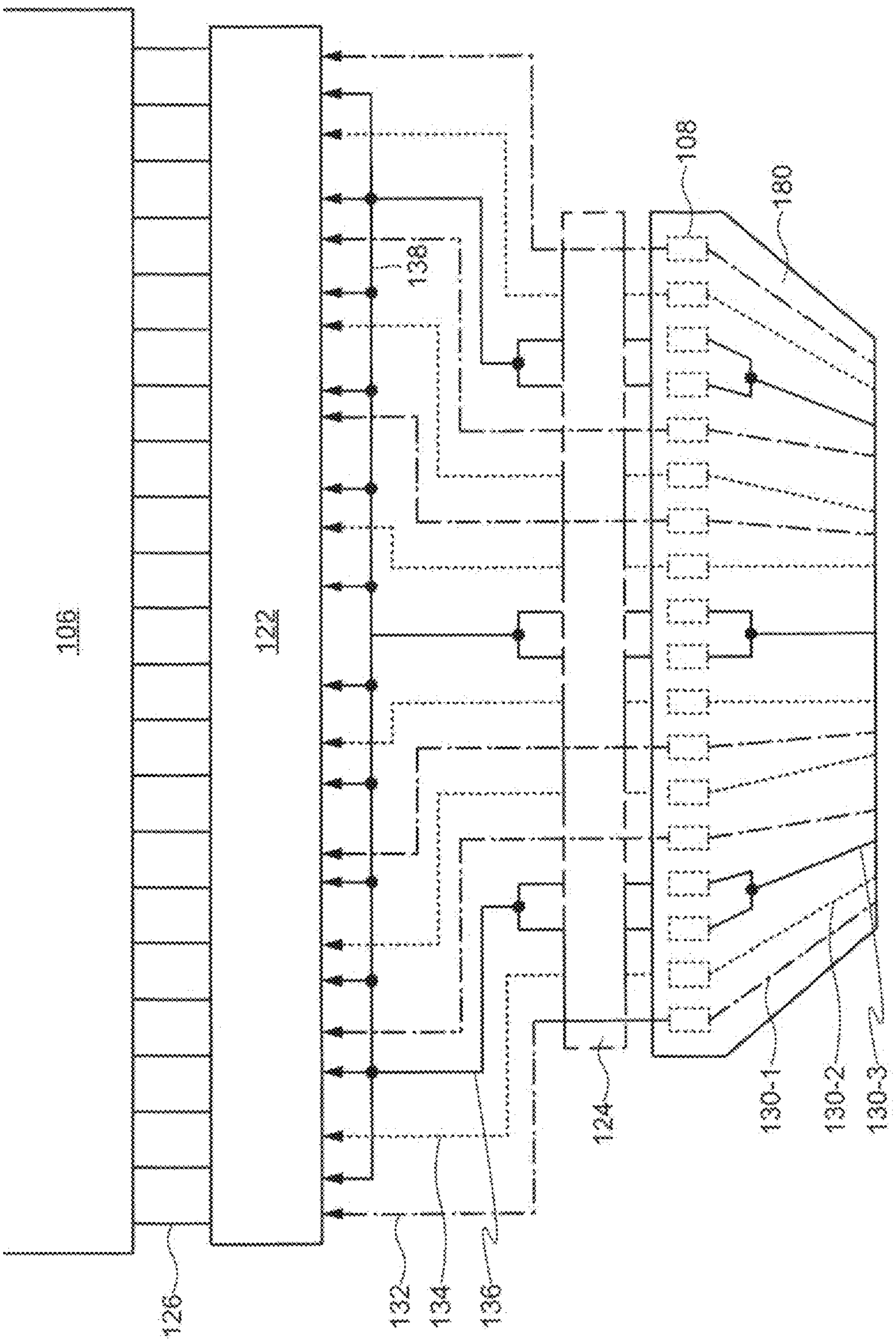
FIG. 2 is a schematic top view of a display device according to an embodiment of the present invention.

The plurality of terminals 108 is electrically connected to a flexible printed circuit board (hereinafter, referred to as an FPC) 180, and the FPC 180 is connected to an external circuit 182 via a connector 184. A high voltage potential ($V_{DD}$) and a low voltage potential ($V_{SS}$) lower than $V_{(DD)}$ are supplied from the external circuit 182 through the FPC 180 and the terminals 108 to drive the display device 100. The voltage potentials $V_{DD}$ and $V_{SS}$ are supplied to the plurality of pixels 104 and the driver circuits without passing through the protection-circuit unit 124. More specifically, each of the voltage potentials $V_{DD}$ and $V_{SS}$ is supplied to one or more terminals 108 selected from the plurality of terminals 108 through the plurality of wirings 130-1 provided in the FPC 180 as shown in FIG. 2. The voltage potentials $V_{DD}$ and $V_{SS}$ are each supplied to the power-source lines 132 extending from the terminals 108 and are further supplied to the pixels 104 and the signal-line driver circuit 122 by the power-source lines 132. Although the power-source lines 132 may intersect the protection-circuit unit 124, they are not connected to the protection circuits structuring the protection-circuit unit 124. Although not illustrated, a portion of the power-source lines 132 is connected to the gate-line driver circuit 120, by which the voltage potentials $V_{DD}$ and $V_{SS}$ are supplied to the gate-line driver circuit 120.

The external circuit 182 further generates a variety of signals including high-frequency clock signals as well as image signals, initialization signals, and reset signals for controlling the plurality of pixels 104, and these signals are supplied to the signal-line driver circuit 122 through the FPC 180, the terminals 108, and the protection-circuit unit 124. More specifically, the clock signals are supplied to the plurality of terminals 108 through a plurality of wirings 130-3 provided in the FPC 180 as shown in FIG. 2. Here, each wiring 130-3 is branched over the FPC 180 and electrically connected to two adjacent terminals 108. In other words, two terminals 108 supplied with the clock signals from one wiring 130-3 are electrically connected to each other over the FPC 180. As described in detail below, the clock signals supplied from each wiring 130-3 are supplied to two adjacent terminals 108, then supplied to one protection circuit included in the protection-circuit unit 124, and further supplied from this one protection circuit to one control-signal wiring 136. The plurality of control-signal wirings 136 is connected to a wiring 138, by which the clock signals are supplied to a plurality of buffers, scanners, and the like (not illustrated) structuring the signal-line driver circuit 122.

On the other hand, the signals with a lower frequency compared to the clock signals, such as the image signals, the initialization signals, and the reset signals, are supplied to two or more terminals 108 selected from the plurality of terminals 108 through a plurality of wirings 130-2 provided in the FPC 180. Unlike the wiring 130-3, the wiring 130-2 is not branched over the FPC, and one wiring 130-2 is connected to one terminal 108. Each of the terminals 108 supplied with the image signals, the initialization signals, the reset signals, or the like is connected to one signal wiring 134 through one protection circuit included in the protection-circuit unit 124. These signals are input to the signal-line driver circuit 122 through the signal wirings 134, and signals for controlling the pixels 104 are supplied to each pixel 104 through the image-signal lines 126 by the signal-line driver circuit 122.

2. Protection Circuit

Figure 3:
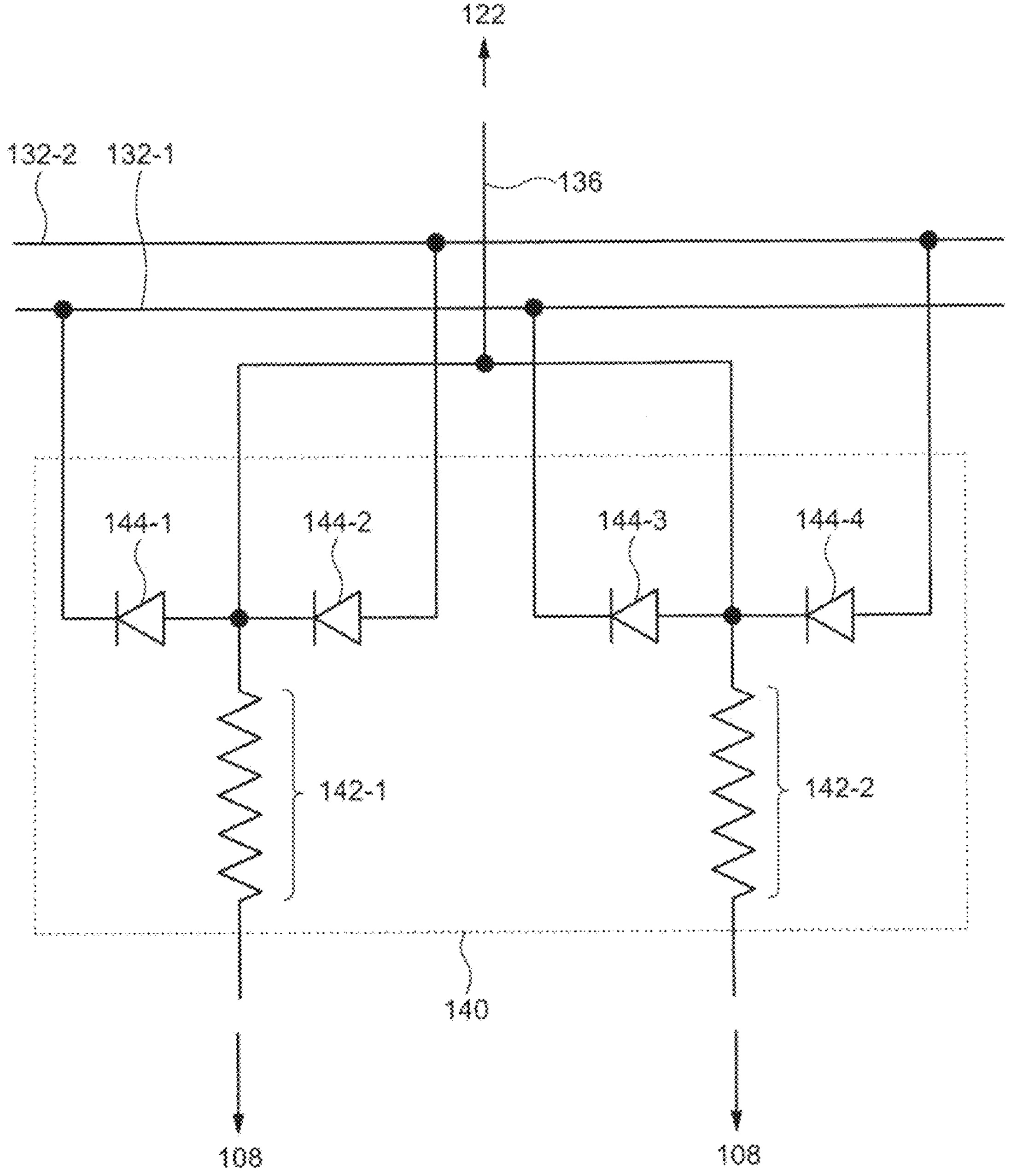
FIG. 3 is an equivalent circuit diagram including a protection circuit according to an embodiment of the present invention.

The protection-circuit unit 124 includes a plurality of protection circuits according to an embodiment of the present invention. An equivalent circuit diagram including one protection circuit 140 is shown in FIG. 3. As shown in FIG. 3, the protection circuit 140 according to an embodiment of the present invention includes two resistor elements (first resistor element 142-1, second resistor element 142-2), and first ends thereof are electrically connected to two terminals 108 adjacent to each other and supplied with the clock signals. Second ends of the resistor element 142 of each protection circuit 140 are electrically connected to each other. As described above, each of the wirings 130-3 is branched over the FPC 180 and electrically connected to two adjacent terminals 108, and these two terminals 108 are connected to one protection circuit 140. Thus, the first ends of the first resistor element 142-1 and the second resistor element 142-2 are electrically connected to each other over the FPC 180. Furthermore, the control-signal wiring 136 is branched into two wirings which are electrically connected to the second ends of the resistor elements 142, respectively. The resistances of the first resistor element 142-1 and the second resistor element 142-2 are identical and equal to or greater than 0.5 kΩ and equal to or less than 5.0 kΩ, for example. The potential input to the signal-line driver circuit 122 can be reduced by providing the resistor elements 142 with a relatively large resistance even if a large voltage is input from the terminals 108 due to a surge current or static electricity.

Each protection circuit 140 may include four diodes (first diode 144-1, second diode 144-2, third diode 144-3, and fourth diode 144-4). Even if large currents such as static electricity and surge currents are input through the resistor elements 142, these diodes allow a part of the large currents to escape to the power-source line 132. The second end of the first resistor element 142-1 is electrically connected to an input terminal of the first diode 144-1 and an output terminal of the second diode 144-2. Meanwhile, the second end of the second resistor element 142-2 is electrically connected to an input terminal of the third diode 144-3 and an output terminal of the fourth diode 144-4. An output terminal of the first diode 144-1 and an output terminal of the third diode 144-3 are electrically connected to each other and to a high-potential power-source line 132-1 supplied with the voltage potential $V_{DD}$. On the other hand, an input terminal of the second diode 144-2 and an input terminal of the fourth diode 144-4 are electrically connected to each other and to the low-potential power-source line 132-2 supplied with the voltage potential $V_{SS}$.

Figure 4:
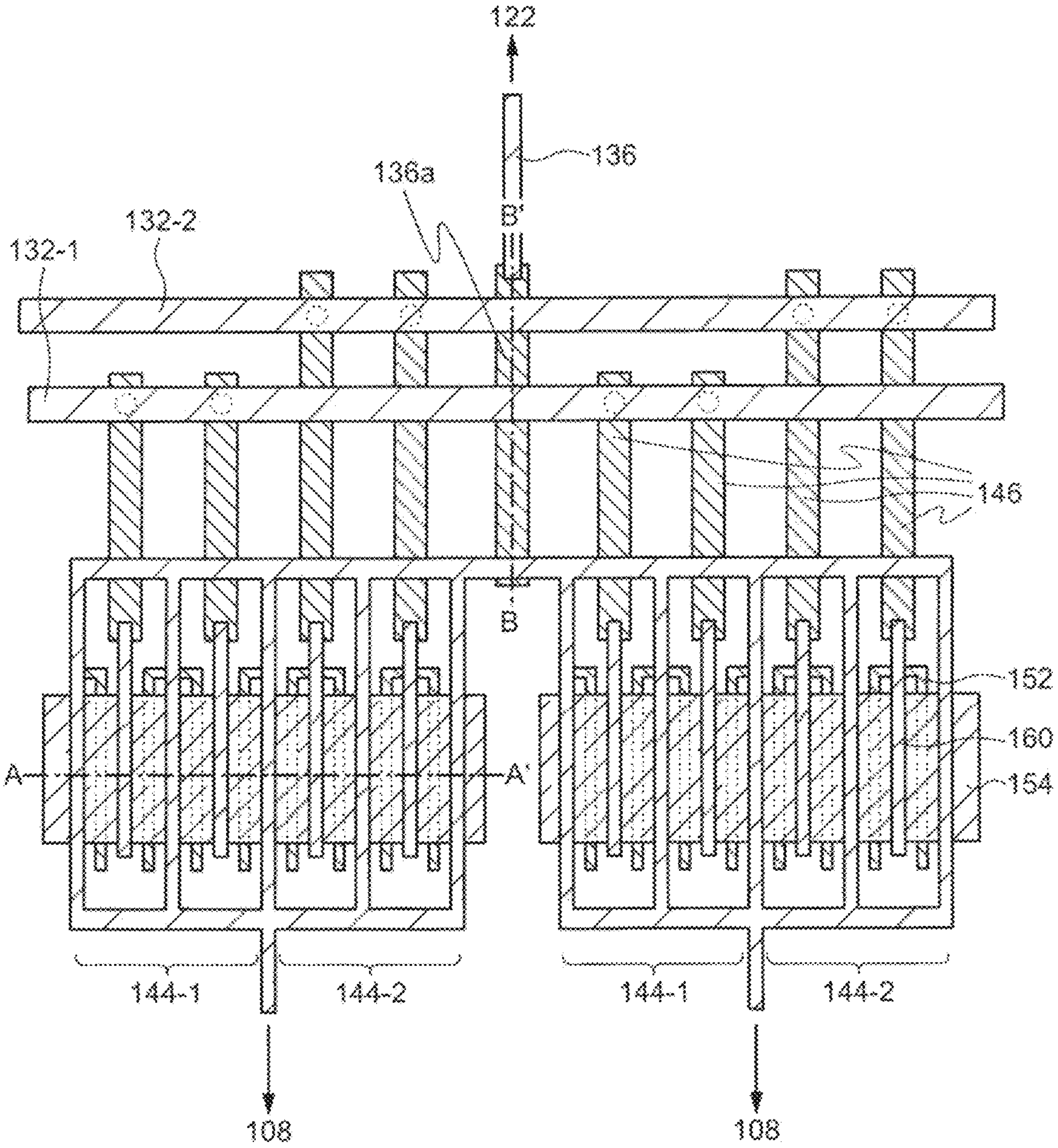
FIG. 4 is a schematic top view of a display device according to an embodiment of the present invention.
Figure 5:
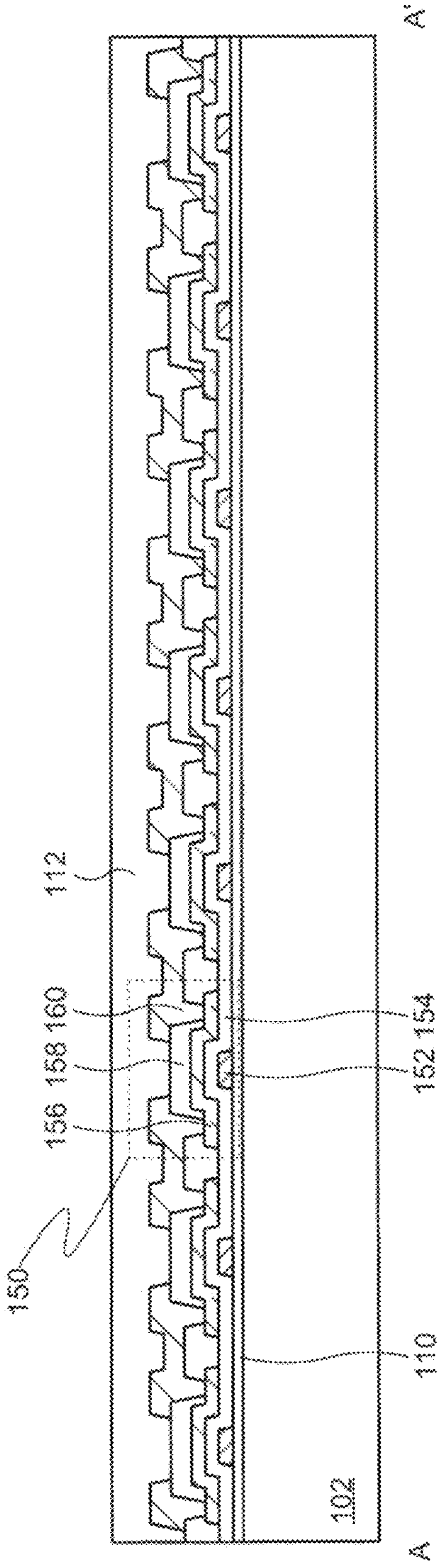
FIG. 5 is a schematic cross-sectional view of a display device according to an embodiment of the present invention.
Figure 6:
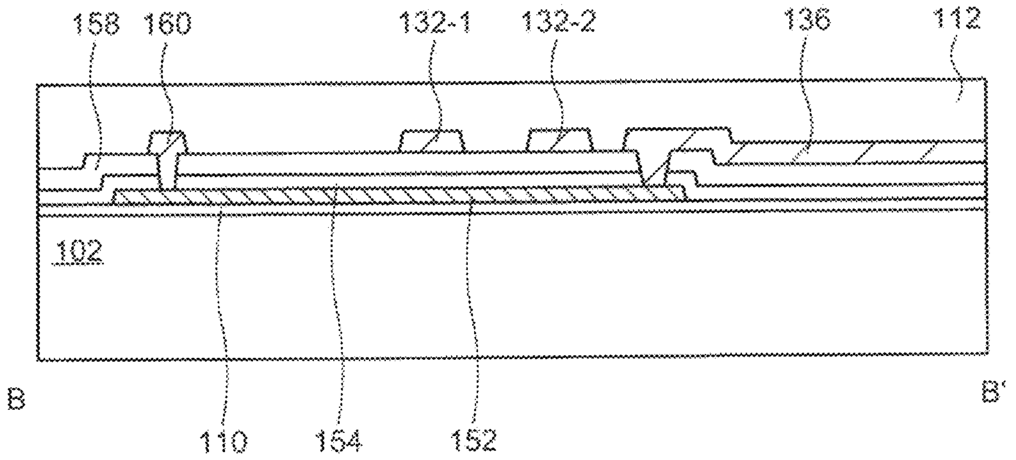
FIG. 6 is a schematic cross-sectional view of a display device according to an embodiment of the present invention.

A schematic top view including the protection circuit 140 is shown in FIG. 4, while schematic views of the cross sections along the chain lines A-A' and B-B' in FIG. 4 are shown in FIG. 5 and FIG. 6, respectively. As can be understood from FIG. 4 and FIG. 5, each diode 144 of the protection circuit 140 is composed of a plurality of transistors 150 electrically connected to each other. There are no restrictions on the structure of the transistors 150, and the transistors 150 may be bottom-gate transistors or top-gate transistors. Alternatively, the transistors 150 may have a plurality of gate electrodes vertically sandwiching a semiconductor film. In the example shown in FIG. 5, the transistors 150 are bottom-gate transistors and are provided over the substrate 102 either directly or through an undercoat 110 which is an optional component. In this example, the transistor 150 is composed of a gate electrode 152, a gate insulating film 154 over the gate electrode 152, a semiconductor film 156 located over the gate insulating film 154 and overlapping the gate electrode 152, an interlayer insulating film 158 over the semiconductor film 156, a pair of source/drain terminals 160 located over the interlayer insulating film 158 and electrically connected to the semiconductor film 156, and the like. The source/drain terminal 160 is shared by adjacent transistors 150, by which adjacent transistors 150 are electrically connected to each other. As shown in FIG. 4, one of the pair of source/drain terminals 160 of each transistor 150 is electrically connected to the terminal 108 via the resistor element 142, while the other source/drain terminal 160 is electrically connected to the high-potential power-source line 132 or the low-potential power-source line 132-2 through a connecting wiring 146 existing in the same layer as the gate electrode 152-1 and is electrically connected to the corresponding gate electrode 152. A leveling film 112 is provided over the transistors 150 (FIG. 5), by which the unevenness caused by the transistors 150 is absorbed and a flat surface is formed.

Since the transistors 150 and the leveling film 112 described above can be formed using known materials and methods, a detailed description is omitted. In brief, the undercoat 110, the gate insulating film 154, the interlayer insulating film 158, and the like may be formed with one or a plurality of films containing a silicon-containing inorganic compound such as silicon nitride and silicon oxide. The leveling film 112 may be configured to include a polymer such as an acrylic resin, an epoxy resin, a silicon resin, and a polyimide resin. In addition to the gate electrode 152 and the source/drain terminals 160, the power-source lines 132 and the connecting wiring 146 may be configured to include a metal such as molybdenum, tantalum, titanium, copper, and aluminum or an alloy including one or a plurality of these metals. Preferably, the metals are selected so that the resistance of the source/drain terminals 160 is lower than that of the gate electrode 152. The control-signal wiring 136 and the power-source lines 132 are formed to exist in the same layer as the source/drain terminals 160. The gate electrode 152 and the connecting wiring 146 are formed to exist in the same layer as each other but in a different layer from the source/drain terminals 160. The semiconductor film 156 may include silicon or an oxide of a Group 13 transition metal such as gallium and indium. The crystallinity of the semiconductor film 156 is also not restricted and may be monocrystalline, polycrystalline, or amorphous.

Although not illustrated, the leveling film 112 extends to the display region 106, and display elements are provided in each pixel 104 using the flat top surface of the leveling film 112. The display element may be a liquid crystal element or an electroluminescence element.

Here, the connection node between the protection circuit 140 and the control-signal wiring 136 is preferably located between the protection circuit 140 and the high-potential power-source line 132-1 and between the protection circuit 140 and the low-potential power-source line 132-2 as shown in FIG. 3. In this case, two resistor elements 142 are connected to one control-signal wiring 136, and the control-signal wiring 136 intersects the high-potential power-source line 132-1 and the low-potential power-source line 132-2. More specifically, as shown in FIG. 4 and FIG. 6, the electrical connection between the protection circuit 140 and the control-signal wiring 136 is performed through a connection wiring **136*a* structuring a part of the control-signal wiring 136, and the connection wiring 136*a* exists in the same layer as the gate electrode 152 and intersects the power-source lines 132. The electrical connection between the control-signal wiring 136 including the connection wiring 136*a* and the protection circuit 140 is performed in an opening formed in the gate insulating film 154 and the interlayer insulating film 158 and arranged between the protection circuit 140 and the power-source lines 132. Therefore, with respect to each protection circuit 140, a wiring which is not connected to and intersects the two power-source lines 132 is only one connection wiring 136*a*. This structure suppresses the increase in parasitic capacitance caused by the power-source lines 132**.

Figure 7:
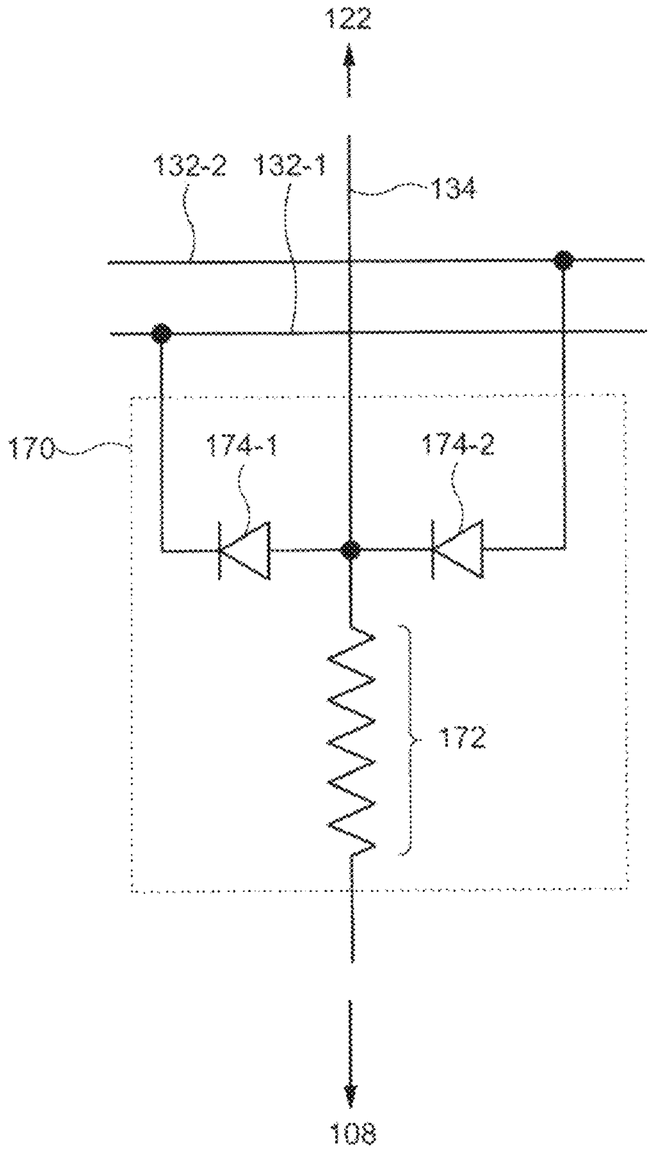
FIG. 7 is an equivalent circuit diagram showing an example of protection circuits.

The protection-circuit unit 124 may further include a protection circuit having a different structure from the protection circuit 140 described above. Specifically, a protection circuit 170 shown in FIG. 7 may be arranged as a protection circuit provided between the terminals 108, to which signals with a relatively low frequency, such as the image signals, the reset signals, and the initialization signals, are supplied, and the signal wiring 134. Unlike the protection circuit 140, the protection circuit 170 has a single resistor element 172, where a first end of the resistor element 172 is electrically connected to one terminal 108 and a second end is electrically connected to the signal wiring 134. The protection circuit 170 may have two diodes 174. An input terminal and an output terminal of one diode 174-1 are electrically connected to the high-potential power-source line 132-1 and the second end of the resistor element 172, respectively, while an input terminal and an output terminal of the other diode 174-2 are electrically connected to the low-potential power-source line 132-2 and the second end of the resistor element 172, respectively.

Conventionally, as a method for improving the withstand voltage of the signal-line driver circuit 122 against surge currents and static electricity, a method has been employed in which the resistance of the resistor elements provided in the protection circuit is increased. However, an increase in resistance of the resistor element leads to an increase in the time constant of the signals supplied through the protection circuit. In particular, an increase in time constant of the clock signal narrows the drive margin of the signal-line driver circuit and is a major cause of inducing abnormal operation. The increase in the time constant due to the increase in resistance of the resistor elements can be suppressed by increasing the number of wirings supplying the relevant signals. However, when the number of signal wirings 134 and power-source lines 132 is increased with increasing resolution of the display device, the parasitic capacitance between the control-signal wiring 136 supplying the clock signals and the signal wiring 134 and the parasitic capacitance between the control-signal wiring 136 and the power-source lines 132 increase in the frame region. Since such an increase in parasitic capacitance conversely causes an increase in time constant, increasing the number of control-signal wirings 136 is not necessarily an effective method of reducing the time constant. In addition, an increase in the number of control-signal wirings 136 causes an increase in the number of terminals 108 and an increase in size of the connector 184.

As described above, a plurality of control-signal wirings 136 is also arranged to supply the clock signals, which are high-frequency signals, in the display device 100. However, the wiring 130-3 supplying the clock signals is branched over the FPC 180, and the clock signals are input to two adjacent terminals 108 in the display device 100. The clock signals input to one protection circuit 140 via these two terminals 108 merge into one control-signal wiring 136 between the protection circuit 140 and the signal-line driver circuit 122, and the clock signals are supplied to the signal-line driver circuit 122 by this one control-signal wiring 136. Therefore, the number of control-signal wirings 136 can be substantially halved without increasing the contribution of the resistor elements in the protection circuit to the increase in the time constant, compared to the conventional display devices in which a plurality of control-signal wirings 136 are provided and a single terminal is connected to the protection circuit connected to each control-signal wiring 136. As a result, the contribution of the parasitic capacitance between the control-signal wiring 136 and the signal wiring 134 and between the control-signal wiring 136 and the power-source lines 132 to the increase in time constant is reduced. This effect reduces the time constant of the clock signals and expands the drive margin of the signal-line driver circuit 122. Furthermore, since a further increase in the number of terminals can be avoided compared to conventional display devices, a further increase in size of the connector 184 can also be avoided.

Furthermore, since the electrical connection between the protection circuit 140 and the control-signal wiring 136 is performed between the protection circuit 140 and the power-source lines 132 as described above, the increase in parasitic capacitance caused by intersection with the power-source line 132 is suppressed. It can be said that this structure also contributes to the reduction of the time constant of the clock signals. Therefore, the drive margin of the signal-line driver circuit can be ensured even in display devices with ultra-high resolution by implementing an embodiment of the present invention. Note that the contribution of the overall resistance (composite resistance) of the control-signal wirings 136 to the increase in time constant increases due to the substantial halving of the number of control-signal wirings 136. However, this contribution can be reduced by forming the control-signal wiring 136 with a low-resistance metal such as aluminum.

3. Modified Examples

The structures of the protection circuit 140 and the display device 100 including the protection circuit 140 are not limited to those described above. Hereinafter, modified examples of the protection circuit 140 and the display device 100 are explained.

3-1. Modified Example 1

Figure 8:
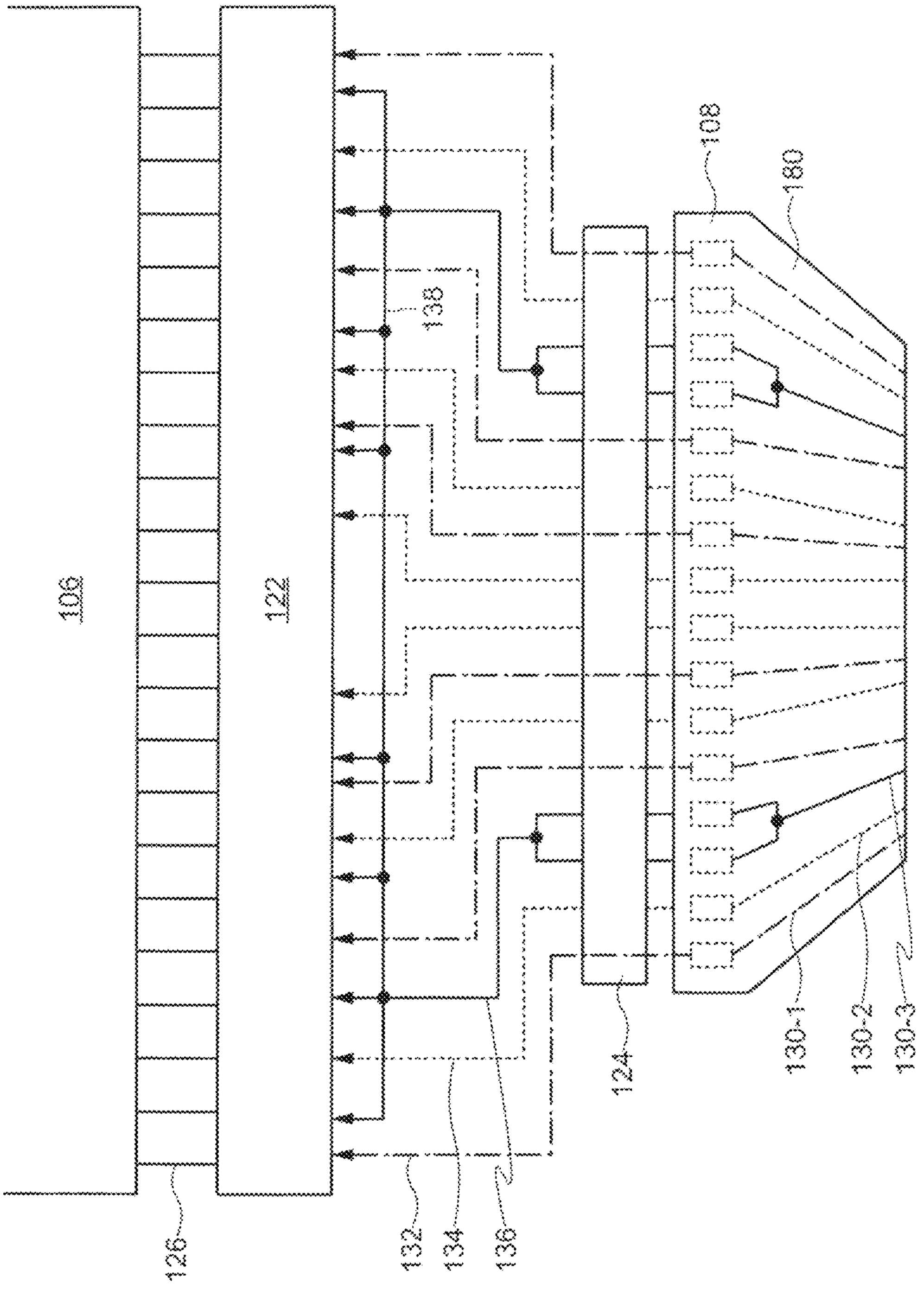
FIG. 8 is a schematic top view of a display device according to an embodiment of the present invention.
Figure 9:
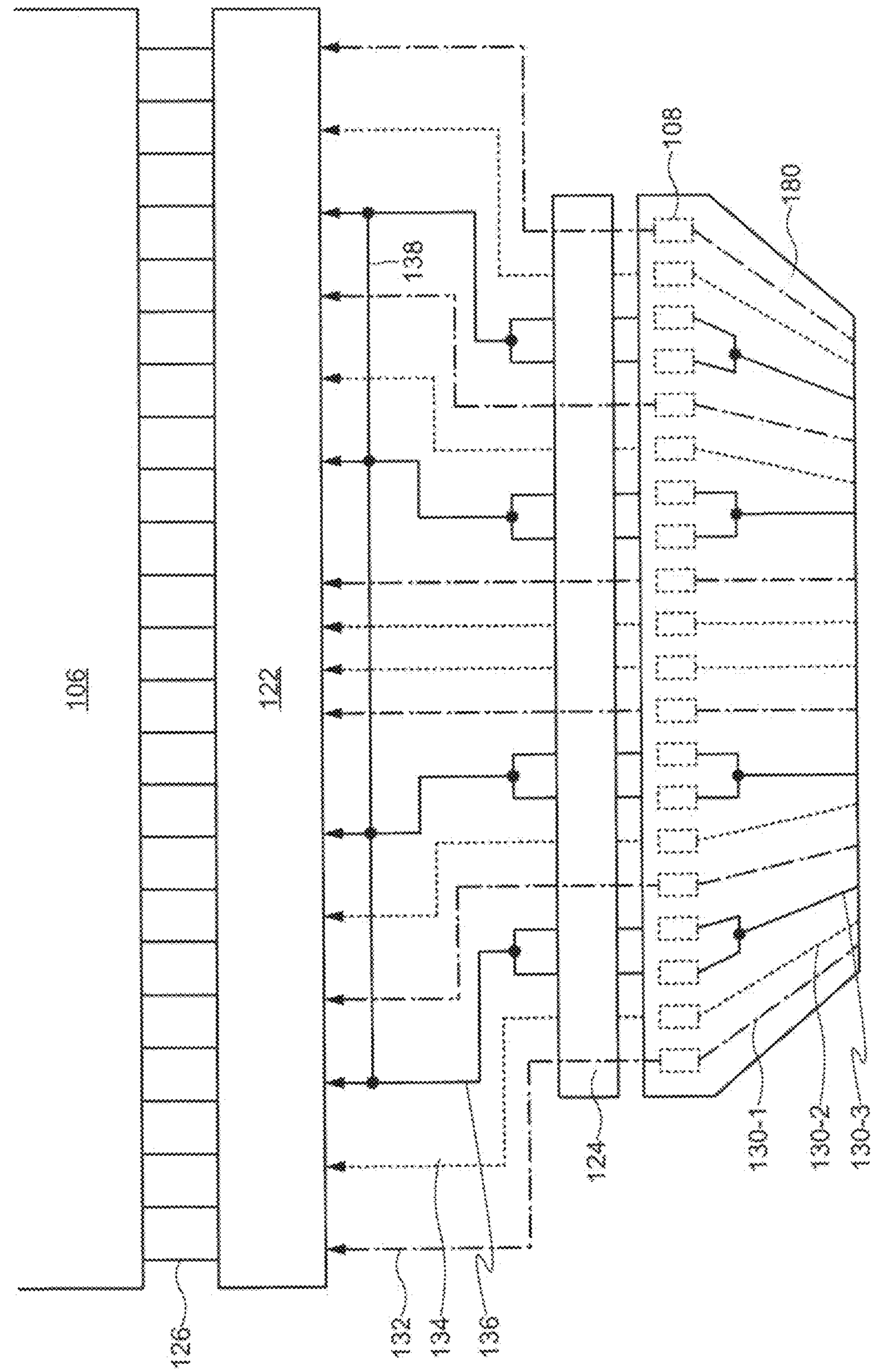
FIG. 9 is a schematic top view of a display device according to an embodiment of the present invention.

In the example shown in FIG. 2, three wirings 130-3 supplying the clock signals are provided over the FPC 180, and each of the wirings 130-3 is divided into two branches and is connected to the adjacent terminals 108. Therefore, clock signals are supplied to a total of six terminals 108. However, there is no restriction on the number of wirings 130-3, and the total number of wirings 130-3 provided over the FPC 180 may be 2 (i.e., the number of terminals 108 connected to the wirings 130-3 is 4) (FIG. 8) or 4 (i.e., the number of terminals 108 connected to wirings 130-3 may be 8) (FIG. 9). Although not illustrated, the total number of wirings 130-3 provided over the FPC 180 may be 5 (i.e., the number of terminals 108 connected to the wirings 130-3 is 10) or more. Preferably, the total number of wirings 130-3 is an even number.

3-2. Modified Example 2

Figure 10:
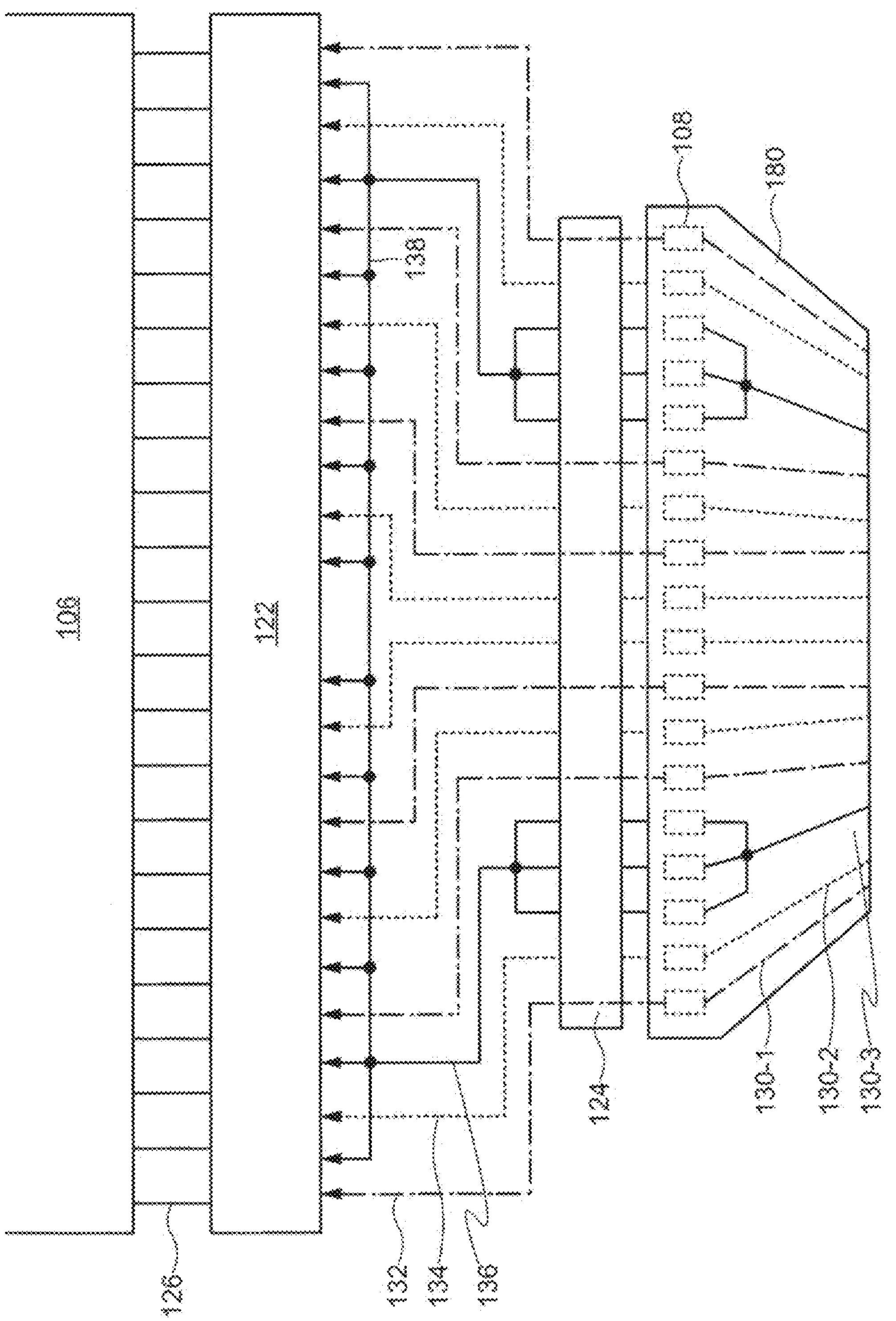
FIG. 10 is a schematic top view of a display device according to an embodiment of the present invention.
Figure 11:
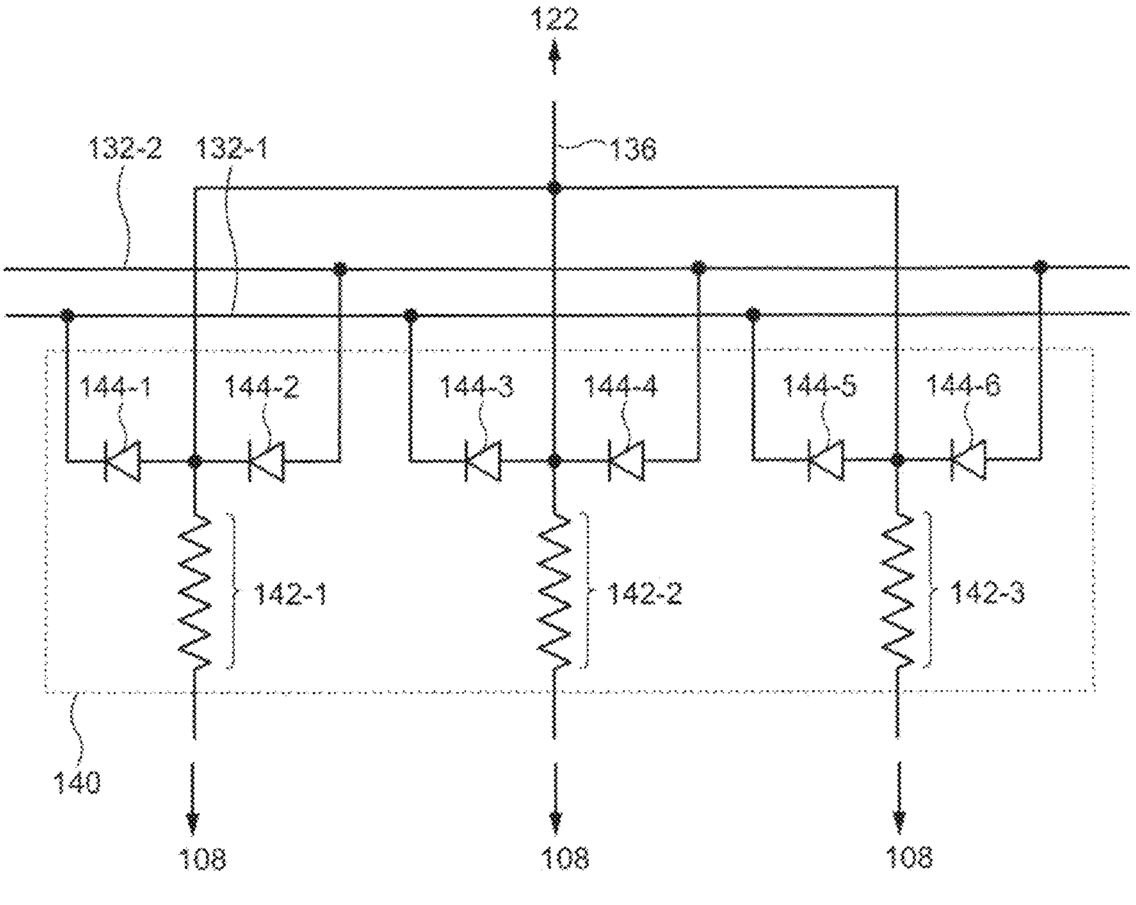
FIG. 11 is an equivalent circuit diagram including a protection circuit according to an embodiment of the present invention.

The number of terminals 108 connected to each of the wiring 130-3 located over the FPC 180 and supplying the clock signals is also not limited to two. For example, each of the wirings 130-3 may be divided into three branches over the FPC 180 and may be electrically connected to three terminals 108 arranged in succession as shown in FIG. 10. In this case, three resistor elements 142 are also provided in the protection circuit 140. Specifically, in addition to the first resistor element 142-1 and the second resistor element 142-2, a third resistor element 142-3 is provided in each protection circuit 140 as shown in FIG. 11. A first end of the third resistor element 142-3 is electrically connected to the terminal 108 different from the terminals 108 to which the first ends of the first resistor element 142-1 and the second resistor element 142-2 are connected. A second end of the third resistor element 142-3 is electrically connected to the control-signal wiring 136. The resistance of the resistor element of the third resistor element 142-3 is also identical to that of the first resistor element 142-1 or the second resistor element 142-2. The contribution of parasitic capacitance between the control-signal wiring 136 and other wirings (the power-source lines 132 and the signal wirings 134) to the time constant can be reduced to ⅓ by adopting this configuration, compared to the case where a plurality of control-signal wirings 136 is provided and one terminal is connected to each control-signal wiring 136 via one protection circuit.

Moreover, the protection circuit 140 may further have additional two diodes (fifth diode 144-5 and sixth diode 144-6) (FIG. 11). The second end of the third resistor element 142-3 is electrically connected to an input terminal of the fifth diode 144-5 and an output terminal of the sixth diode 144-6. An output terminal of the fifth diode 144-5 is electrically connected to the high-potential power-source line 132-1, and an input terminal of the sixth diode 144-6 is electrically connected to the low-potential power-source line 132-2. Thus, the output terminal of the fifth diode 144-5 is electrically connected to the output terminals of the first diode 144-1 and the third diode 144-3, and the input terminal of the sixth diode 144-6 is electrically connected to the input terminals of the second diode 144-2 and the fourth diode 144-4.

Figure 12:
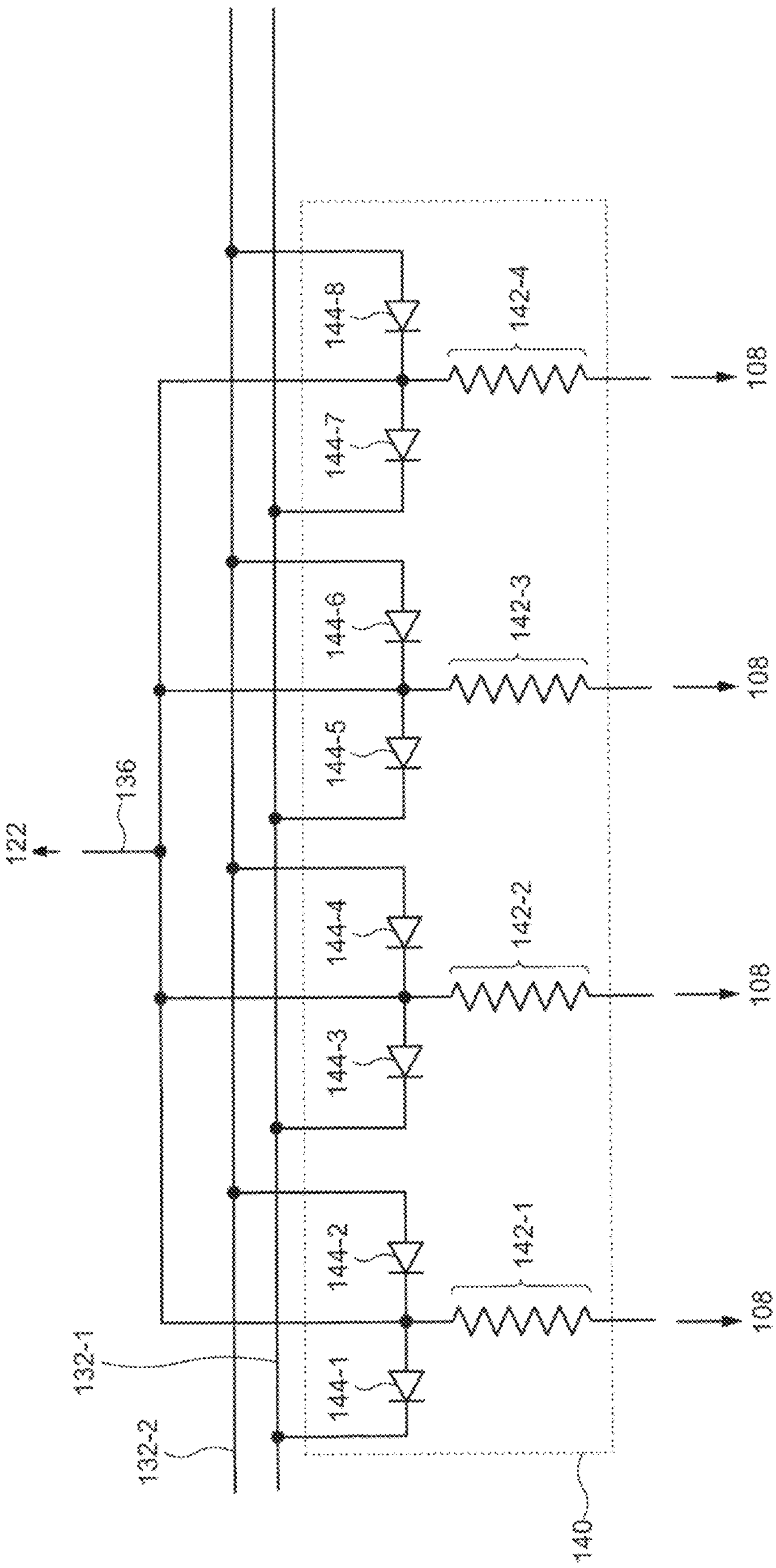
FIG. 12 is an equivalent circuit diagram including a protection circuit according to an embodiment of the present invention.

Alternatively, each of the wirings 130-3 may be divided into four branches over the FPC 180 and electrically connected to the successively arranged four terminals 108. In this case, four resistor elements 142 are also provided in the protection circuit 140. Specifically, each protection circuit 140 is further provided with a fourth resistor element 142-4 as shown in FIG. 12. A first end of the fourth resistor element 142-4 is electrically connected to the terminal 108 different from the terminals 108 to which the first ends of the first resistor element 142-1 to the third resistor element 142-3 are connected. A second end of the fourth resistor element 142-4 is electrically connected to the control-signal wiring 136. The contribution of parasitic capacitance between the control-signal wiring 136 and other wirings (power-source lines 132 and signal wirings 134) to the time constant can be reduced to ¼ by adopting this configuration, compared to the case where a plurality of control-signal wirings 136 is provided and one terminal is connected to each control-signal wiring 136 via one protection circuit.

In this case, the protection circuit 140 may also have an additional two diodes (seventh diode 144-7 and eighth diode 144-8). The second end of the fourth resistor element 142-4 is electrically connected to an input terminal of the seventh diode 144-7 and an output terminal of the eighth diode 144-8. An output terminal of the seventh diode 144-7 is electrically connected to the high-potential power-source line 132-1, and an input terminal of the eighth diode 144-8 is electrically connected to the low-potential power-source line 132-2. Thus, the output terminal of the seventh diode 144-7 is electrically connected to the output terminals of the first diode 144-1, the third diode 144-3, and the fifth diode 144-5, while the input terminal of the eighth diode 144-8 is electrically connected to the input terminals of the second diode 144-2, the fourth diode 144-4, and the sixth diode 144-6.

3-3. Modified Example 3

For the purpose of further restraining large currents caused by static electricity and surge currents from entering the driver circuits such as the signal-line driver circuit 122, a resistor element may further be provided in the protection circuit 140. Specifically, an auxiliary resistor element 148 may be provided between each resistor element 142 and the control-signal wiring 136 as shown in the equivalent circuit diagram of FIG. 13. In the example shown in FIG. 13, a first auxiliary resistor element 148-1 is provided between the first resistor element 142-1 and the control-signal wiring 136, and a second auxiliary resistor element 148-2 is provided between the second resistor element 142-2 and the control-signal wiring 136. That is, a first end and a second end of the first auxiliary resistor element 148-1 are electrically connected to the second end of the first resistor element 142-1 and the control-signal wiring 136, respectively, while a first end and a second end of the second auxiliary resistor element 148-2 are electrically connected to the second end of the second resistor element 142-2 and the control-signal wiring 136, respectively. Although not illustrated, when three or more resistor elements 142 are provided (see FIG. 11 and FIG. 12), the auxiliary resistor element 148 is provided between each resistor element 142 and the control-signal wiring 136.

Figure 13:
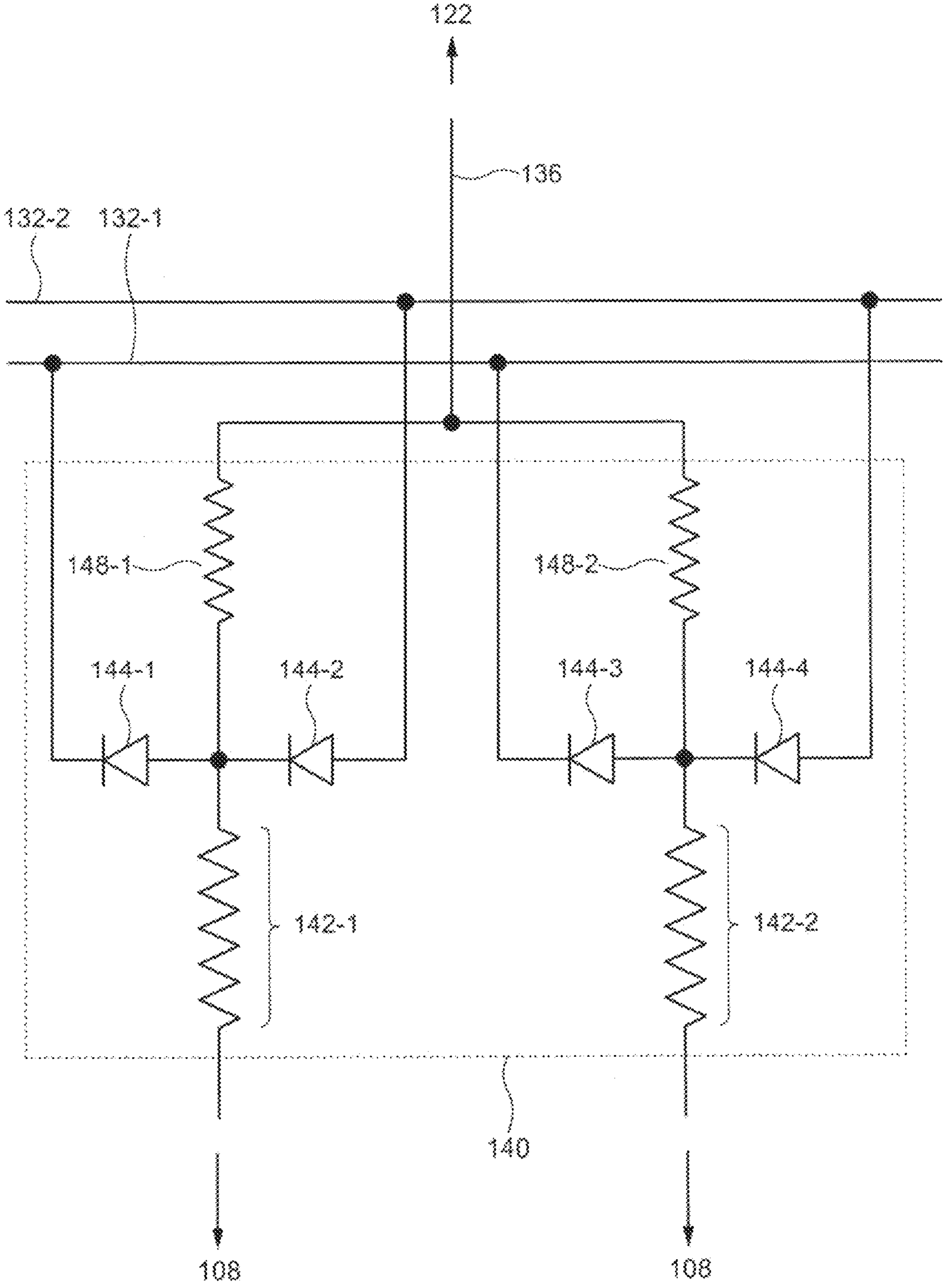
FIG. 13 is an equivalent circuit diagram including a protection circuit according to an embodiment of the present invention.
Figure 14:
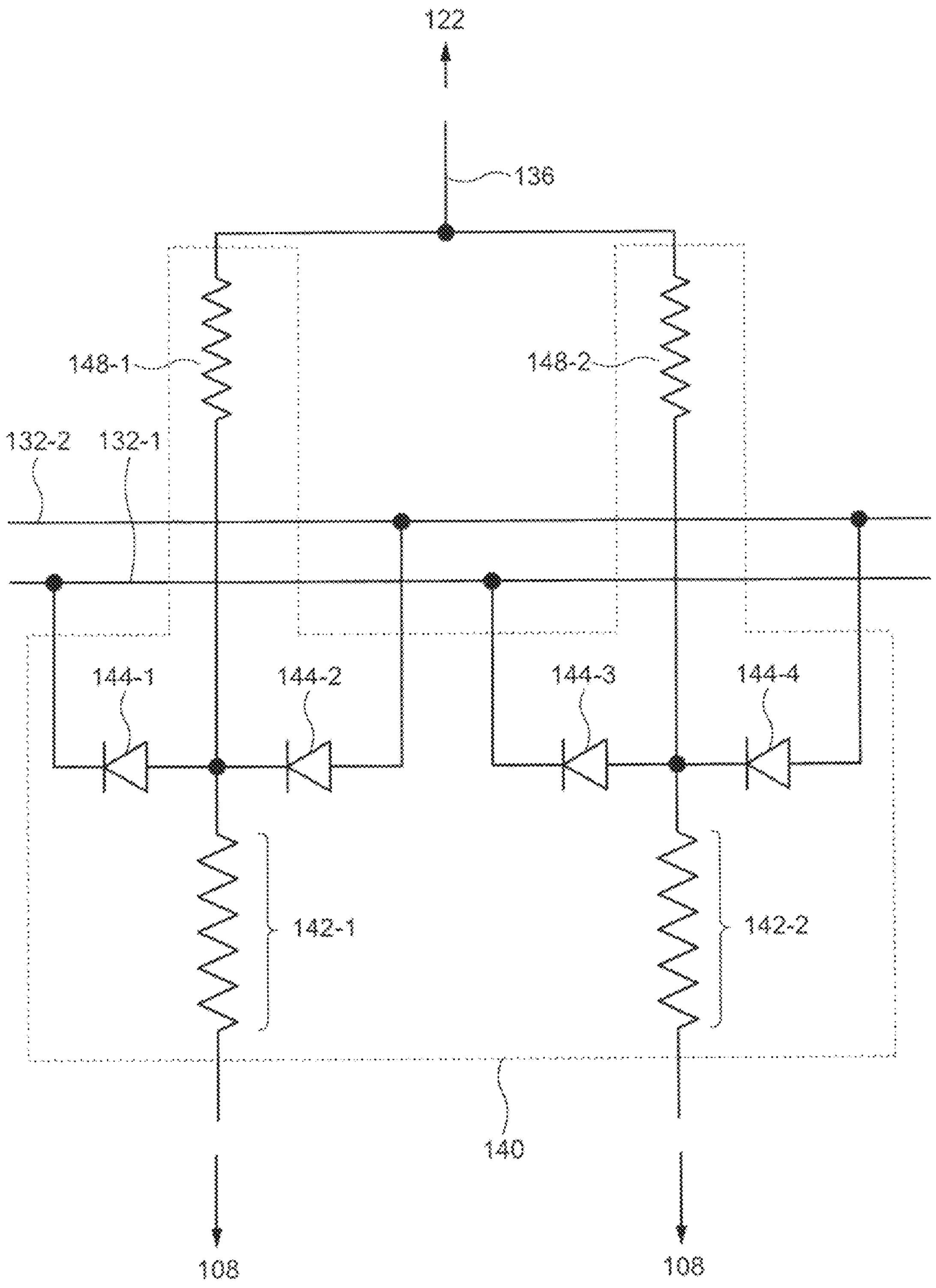
FIG. 14 is an equivalent circuit diagram including a protection circuit according to an embodiment of the present invention.

Similar to the example shown in FIG. 3 and the like, the connection node between the protection circuit 140 and the control-signal wiring 136 may be located between the power-source line 132 and the auxiliary resistor element 148 (FIG. 13). This structure prevents the increase in parasitic capacitance caused by the power-source lines 132. However, in consideration of layout, the power-source lines 132 may be arranged to intersect the protection circuit 140, and the connection node between the protection circuit 140 and the control-signal wiring 136 may be placed between the signal-line driver circuit 122 and the power-source lines 132 as shown in FIG. 14 and FIG. 15, depending on the size of the auxiliary resistor element 148.

Figure 15:
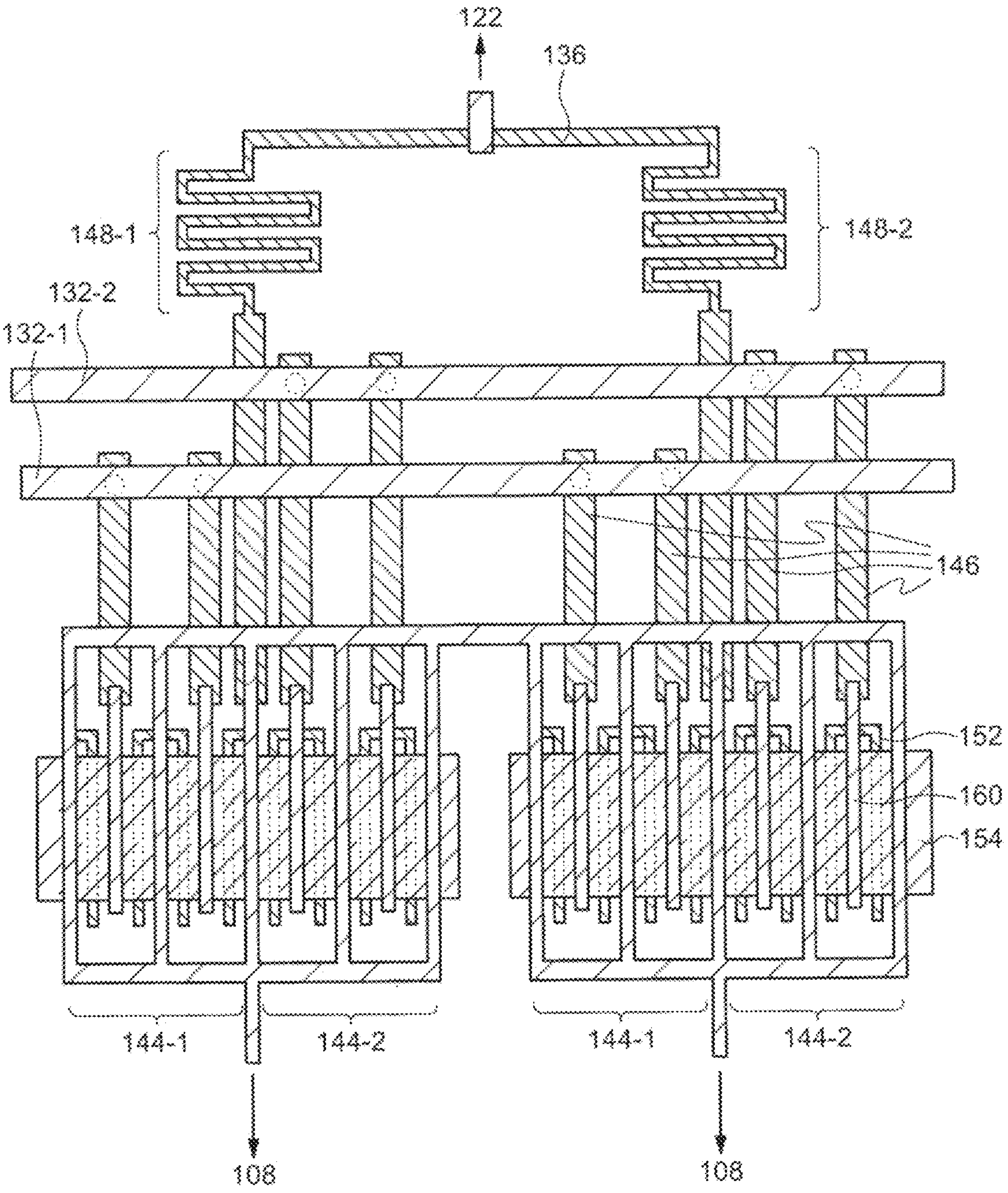
FIG. 15 is a schematic top view of a display device according to an embodiment of the present invention.

As shown in FIG. 15, the auxiliary resistor element 148 is preferably formed using a metal film existing in the same layer as the gate electrode 152 structuring the transistor 150. The auxiliary resistor element 148 is formed to have a smaller width compared to other wirings (e.g., the control-signal wiring 136 and the connecting wiring 146). In order to obtain resistance, the auxiliary resistor element 148 is provided with a bent or curved structure to have a longer current path. The resistance of the auxiliary resistor element 148 may be the same as or different from that of the resistor element 142 and may be set to be equal to or greater than 0.5 kΩ and equal to or less than 5.0 kΩ, for example. The use of the auxiliary resistor element 148 more effectively prevents electrostatic breakdown and destruction of the driver circuits by a surge current.

3-4. Modified Example 4

In the above examples, the protection circuit 140 is connected to the terminal 108 input with the clock signals and the control-signal wiring 136. However, the protection circuit 140 may be provided to the signal wiring 134 input with other signals having a lower frequency than the clock signal (e.g., image signal, reset signal, initialization signal, and the like). In this case, although not illustrated, each wiring 130-2 is divided into a plurality of branches over the FPC 180 and connected to a plurality of terminals 108. The protection circuit 140 shown in FIG. 3 or the like is connected to these multiple terminals 108, and the plurality of resistor elements 142 of this protection circuit 140 is connected to one signal wiring 134. This configuration also prevents an increase in the time constant of the image signal, the reset signal, the initialization signal, and the like. Furthermore, although not illustrated, the protection circuit 140 may be provided to a variety of wirings for supplying signals input to the gate-line driver circuit 120 (e.g., enable signals) and signals input to a touch panel (sensor signals) provided over the display device 100.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed:

1. A display device comprising:

a plurality of pixels;

a driver circuit configured to control the plurality of pixels;

a first power-source line configured to provide the plurality of pixels with a first potential;

a second power-source line configured to provide the plurality of pixels with a second potential lower than the first potential;

a plurality of protection circuits; and a plurality of control-signal wirings electrically connecting the plurality of protection circuits to the driver circuit, wherein each of the plurality of protection circuits comprises:

a first resistor element configured so that a first end of the first resistor element is supplied with a control signal and a second end of the first resistor element is electrically connected to one of the plurality of control-signal wirings;

a second resistor element configured so that a first end of the second resistor element is supplied with the control signal and a second end of the second resistor element is electrically connected to the one of the plurality of control-signal wirings;

a first auxiliary resistor element with a first end electrically connected to the second end of the first resistor element and a second end electrically connected to the control-signal wiring; and a second auxiliary resistor element with a first end electrically connected to the second end of the second resistor element and a second end electrically connected to the control-signal wiring.

2. The display device according to claim 1, wherein each of the protection circuits comprises a first diode, a second diode, a third diode, and a fourth diode, and wherein, in each of the plurality of protection circuits, the second end of the first resistor element is electrically connected to an input terminal of the first diode and an output terminal of the second diode, the second end of the second resistor element is electrically connected to an input terminal of the third diode and an output terminal of the fourth diode, the first power-source line is electrically connected to an output terminal of the first diode and an output terminal of the third diode, and the second power-source line is electrically connected to an input terminal of the second diode and an input terminal of the fourth diode.

3. The display device according to claim 1, wherein the control signal is a clock signal.

4. The display device according to claim 1, wherein the control signal is selected from an image signal, a reset signal, and an initialization signal.

5. The display device according to claim 1, further comprising a flexible printed circuit board electrically connected to the driver circuit, wherein the first end of the first resistor element and the first end of the second resistor element of each of the plurality of protection circuits are electrically connected to each other over the flexible printed circuit board.

6. The display device according to claim 1, wherein the first power-source line and the second power-source line intersect the plurality of control-signal wirings, and wherein, with respect to each of the protection circuits, an electrical connection of the protection circuit and the control-signal wiring is performed between the first power-source line and the protection circuit and between the second power-source line and the protection circuit.

7. The display device according to claim 1, wherein the first power-source line and the second power-source line intersect the plurality of protection circuits, and wherein, with respect to each of the protection circuits, an electrical connection between the protection circuit and the control-signal wiring is performed between the driver circuit and the first power-source line and between the driver circuit and the second power-source line.

8. A display device comprising:

a plurality of pixels;

a driver circuit configured to control the plurality of pixels;

a first power-source line configured to provide the plurality of pixels with a first potential;

a second power-source line configured to provide the plurality of pixels with a second potential lower than the first potential;

a plurality of protection circuits; and a plurality of control-signal wirings electrically connecting the plurality of protection circuits to the driver circuit, wherein each of the plurality of protection circuits comprises:

a first resistor element configured so that a first end of the first resistor element is supplied with a control signal and a second end of the first resistor element is electrically connected to one of the plurality of control-signal wirings;

a second resistor element configured so that a first end of the second resistor element is supplied with the control signal and a second end of the second resistor element is electrically connected to the one of the plurality of control-signal wirings;

a third resistor element with a first end configured to be supplied with the control signal and a second end electrically connected to the control-signal wiring; and a third auxiliary resistor element with a first end electrically connected to the second end of the third resistor element and a second end electrically connected to the control-signal wiring.

9. The display device according to claim 8, wherein each of the plurality of protection circuits further comprises a fifth diode and a sixth diode, the second end of the third resistor element is electrically connected to an input terminal of the fifth diode and an output terminal of the sixth diode, the first power-source line is electrically connected to an output terminal of the fifth diode, and the second power-source line is electrically connected to an input terminal of the sixth diode.

10. A protection circuit comprises:

a first resistor element having a first end and a second end;

a second resistor element having a first end and a second end;

a first auxiliary resistor element with a first end electrically connected to the second end of the first resistor element; and a second auxiliary resistor element with a first end electrically connected to the second end of the second resistor element, wherein the first end of the first resistor element and the first end of the second resistor element are electrically connected to each other and are configured to be supplied with a control signal, the second end of the second resistor element and the second end of the first resistor element are electrically connected to each other, the control signal is selected from a clock signal, an image signal, a reset signal, and an initialization signal, and an electrical connection between the second end of the first resistor element and the second end of the second resistor element is performed through the first auxiliary resistor element and the second auxiliary resistor element.

11. The protection circuit according to claim 10, wherein the control signal is a clock signal.

12. The protection circuit according to claim 10, further comprising a first diode, a second diode, a third diode, and a fourth diode, wherein the second end of the first resistor element is electrically connected to an input terminal of the first diode and an output terminal of the second diode, the second end of the second resistor element is electrically connected to an input terminal of the third diode and an output terminal of the fourth diode, an output terminal of the first diode and an output terminal of the third diode are electrically connected to each other, and an input terminal of the second diode and an input terminal of the fourth diode are electrically connected to each other.

13. The protection circuit according to claim 10, further comprising a third resistor element with a first end electrically connected to the first end of the first resistor element and a second end electrically connected to the second end of the first resistor element.

14. The protection circuit according to claim 13, further comprising a fifth diode and a sixth diode, wherein the second end of the third resistor element is electrically connected to an input terminal of the fifth diode and an output terminal of the sixth diode.

15. The protection circuit according to claim 12, further comprising:

a third resistor element with a first end electrically connected to the first end of the first resistor element and a second end electrically connected to the second end of the first resistor element; and a fifth diode and a sixth diode, wherein the second end of the third resistor element is electrically connected to an input terminal of the fifth diode and an output terminal of the sixth diode, an output terminal of the fifth diode is electrically connected to the output terminal of the first diode and the output terminal of the third diode, and an input terminal of the sixth diode is electrically connected to the input terminal of the second diode and the input terminal of the fourth diode.

16. The protection circuit according to claim 13, further comprising a third auxiliary resistor element with a first end electrically connected to the second end of the third resistor element and a second end electrically connected to the second end of the first resistor element and the second end of the second resistor element.

* * * * *